T. M. COYLE.
COMBINATION DRYING AND MOISTENING MACHINE.
APPLICATION FILED MAY 23, 1911.
1,015,786.
Patented Jan. 30, 1912.
5 SHEETS—SHEET 1.
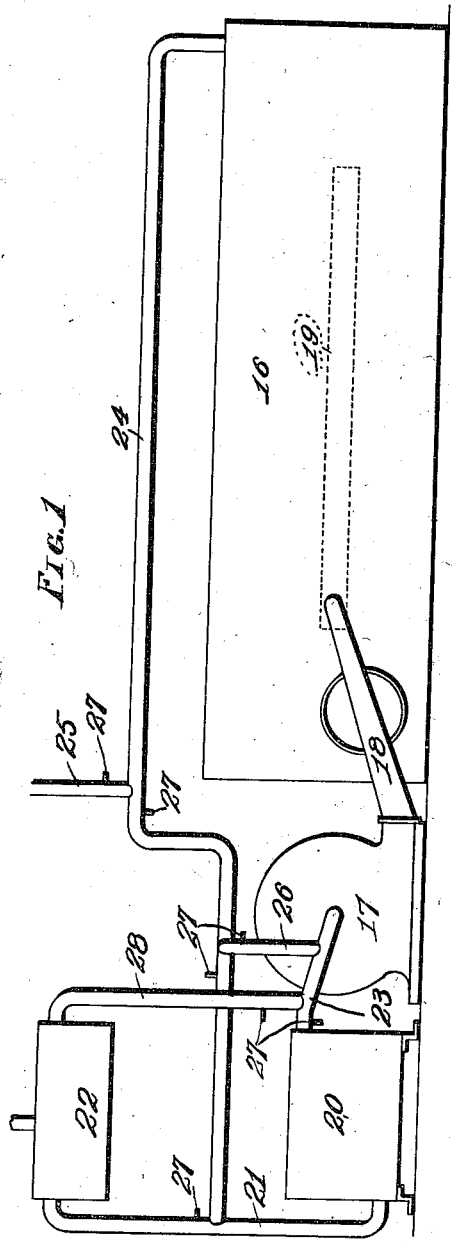
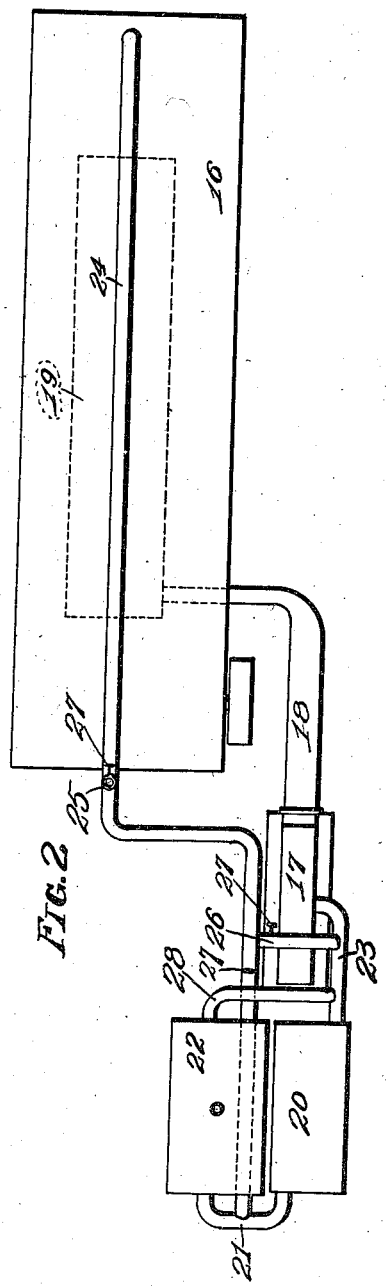
Witnesses
M. E. Lindsay.
W. C. Stein.
Inventor
Thomas M. Coyle
by Alfred A. Erick's atty.

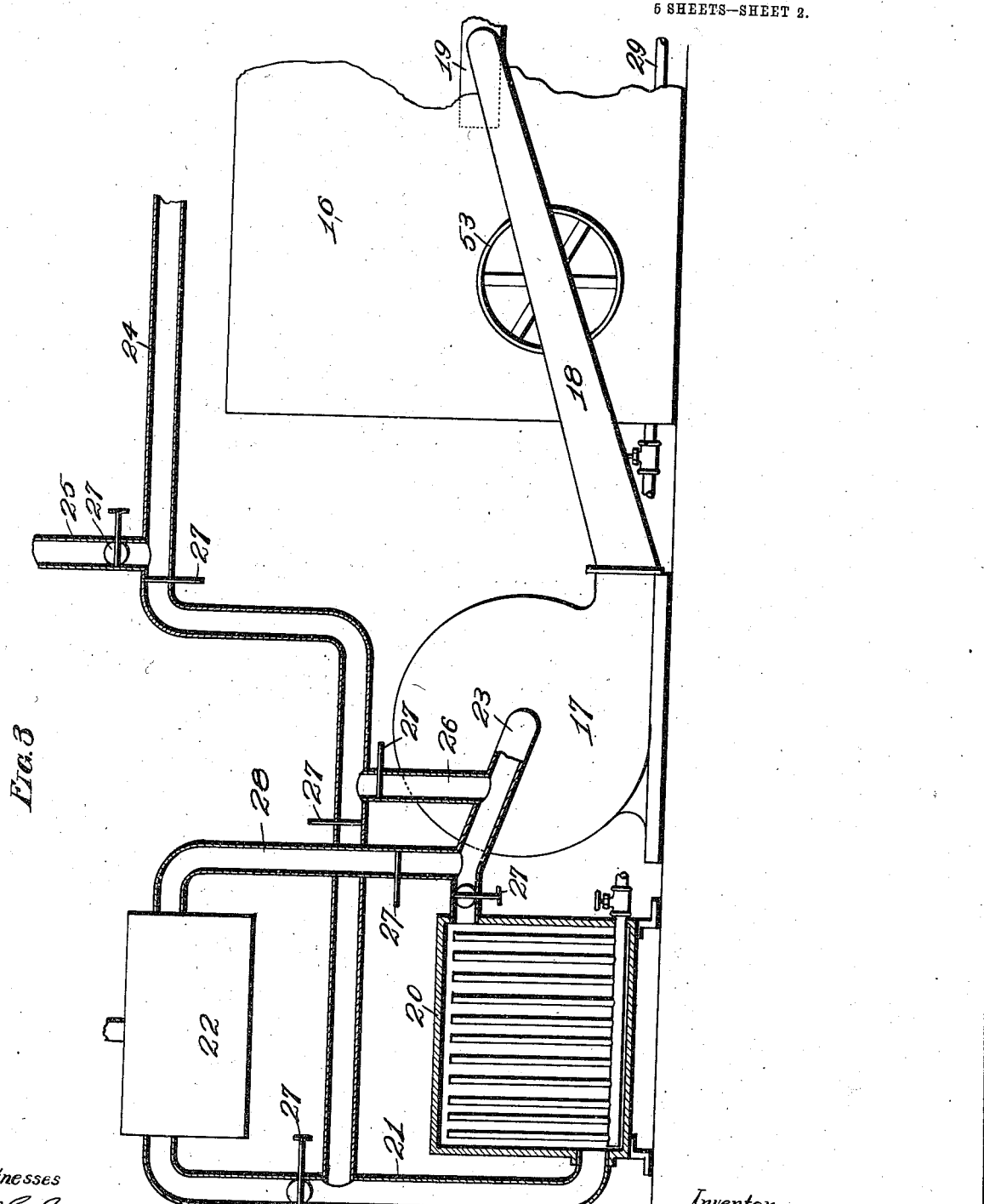

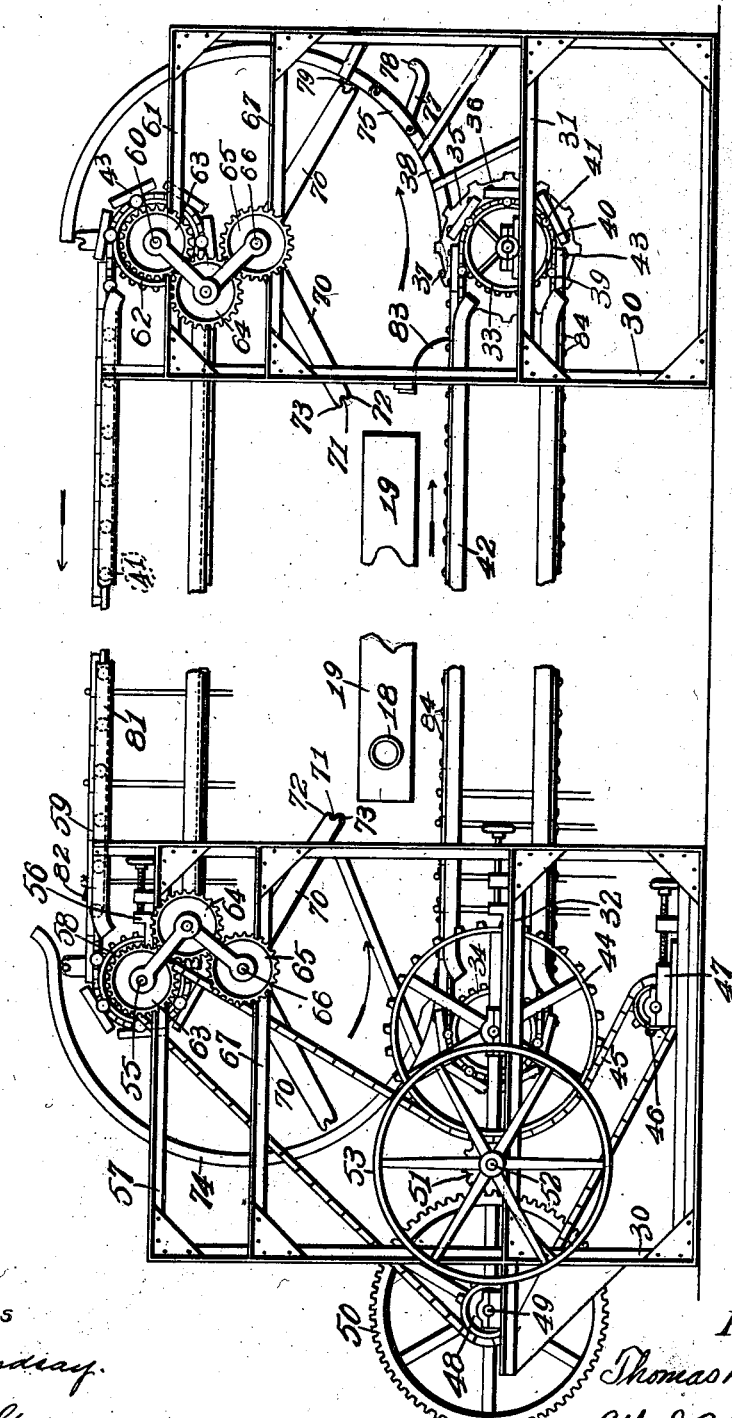

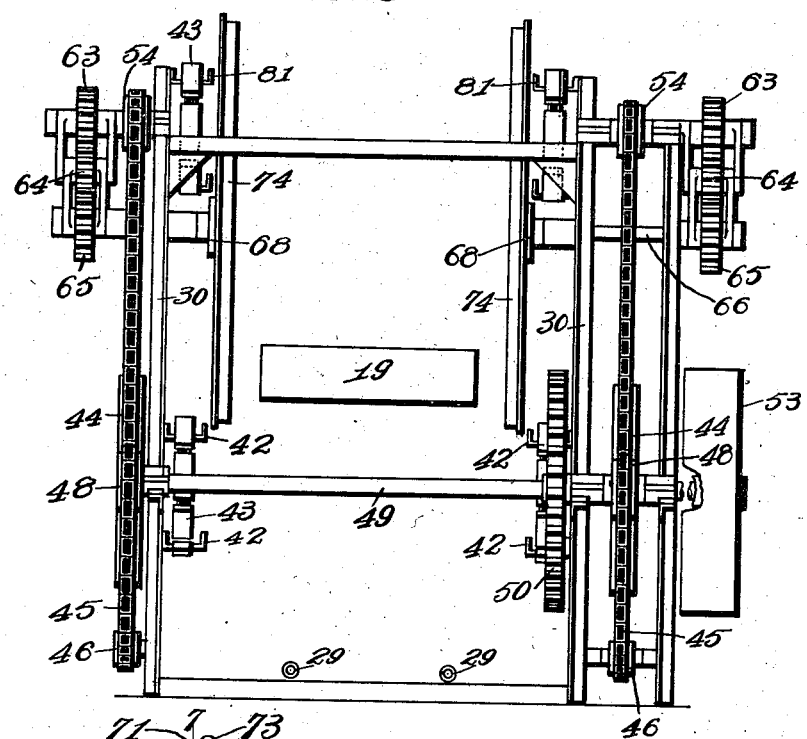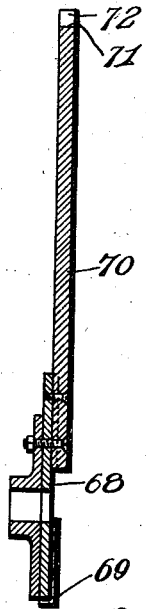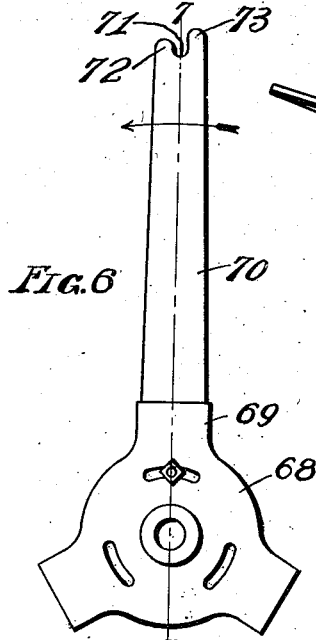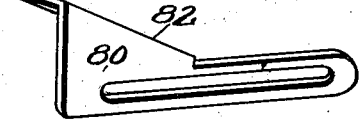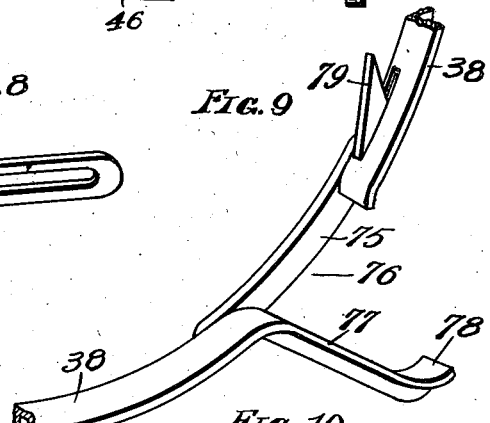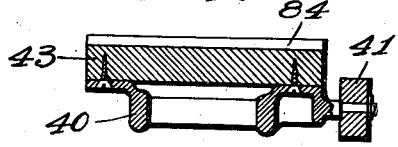

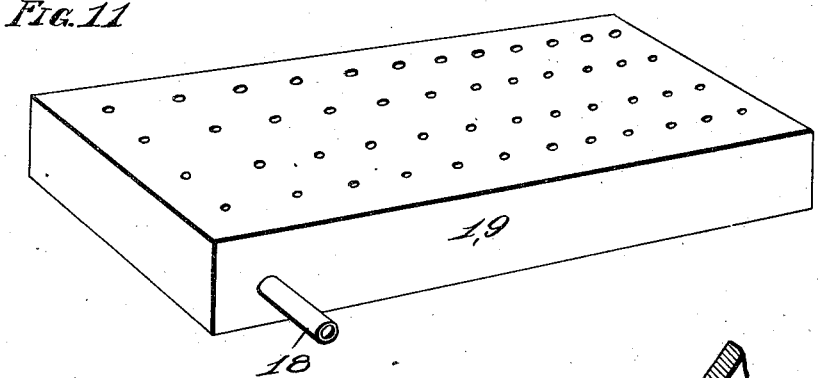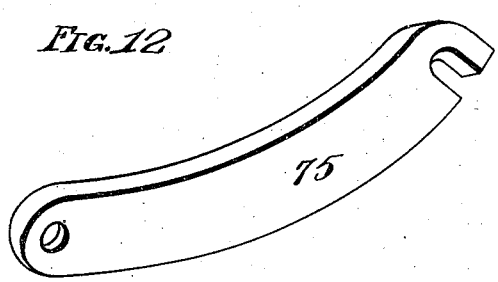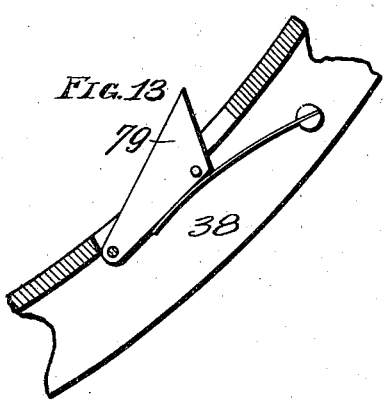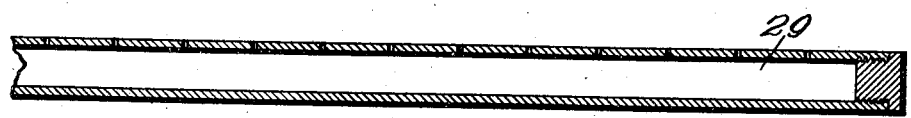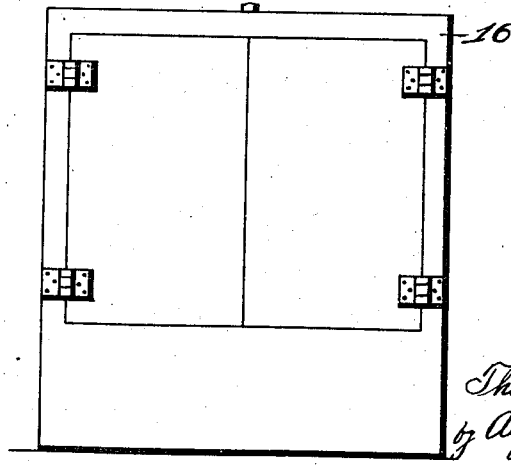

UNITED STATES PATENT OFFICE.

THOMAS M. COYLE, OF ST. LOUIS, MISSOURI.

COMBINATION DRYING AND MOISTENING MACHINE.

1,015,786.      Specification of Letters Patent.      Patented Jan. 30, 1912.

Application filed May 23, 1911. Serial No. 629,077.

*To all whom it may concern:*

Be it known that I, THOMAS M. COYLE, a citizen of the United States, and resident of St. Louis, Missouri, have invented certain new and useful Improvements in Combination Drying and Moistening Machines, of which the following is a specification.

This invention relates to improvements in a combination drying and moistening machine used more particularly for the treating of spaghetti and like articles and has for its object a housing in which is mounted a pair of traveling conveyers one operating at a greater speed than the other, and a means for conveying the articles from one conveyer to the other so as to continue the travel of the articles in an endless circuit.

A further object of my invention is to provide a means for conveying heated air into the housing so as to contact with the articles, and a steam bath by which the articles are moistened, which is necessary for the process of treating such edible articles as have been specified.

A further object of my invention is to construct a machine having a pair of endless conveyers on which articles may be placed for drying or moistening the same and can be used for moistening and drying laundry or other articles as well as the treating of edible articles for which the machine has been especially constructed.

Figure 1 is a side view of my invention. Fig. 2 is a top plan view of the same. Fig. 3 is an enlarged detail sectional view of the heat distributing mechanism used in connection with my improved machine. Fig. 4 is a side elevation of the machine showing the operating mechanism, the said machine being broken away designating that the same may be of any length. Fig. 5 is an end view of the machine showing the operative mechanism. Fig. 6 is a detail view of one of the delivering arms and its support made use of in connection with my invention. Fig. 7 is a vertical sectional view of the same taken on the line 7—7 of Fig. 6. Fig. 8 is a detail perspective view of one of the stops made use of in connection with the upper conveyer.
Fig. 9 is a detail perspective view of a portion of the guide frame showing the releasing and feeding attachment located on the front end of the machine. Fig. 10 is a cross sectional view of one of the links made use of in forming the conveyers. Fig. 11 is a detail perspective view of the heat distributing box made use of in connection with my invention. Fig. 12 is a detail perspective view of the latch made use of in connection with the feeding end of the guide frame. Fig. 13 is a side elevation of a dog located in the front guide frame and is used for supporting the rods on which the articles are placed when feeding the same into the machine. Fig. 14 is a sectional view of a pipe made use of for supplying steam or moisture into the housing. Fig. 15 is the front end view of the housing showing the doors through which the articles are fed and discharged.

In carrying out my invention I provide a suitable housing 16 which is constructed of any desirable length, but in reality when the machine is constructed for treating spaghetti the same is of a length approximately eighty-five feet. In this housing is located the operating mechanism, which will be fully hereinafter described in detail.

In one end of the housing is located a fan or blower 17, its discharge end connected to a pipe 18, which leads into the side of the housing and connects to the heat distributing box 19. In front of the fan or blower 17 is located a heater 20 to which is connected an air pipe 21, its opposite end connected to a filter 22 through which the air from the atmosphere is purified before being admitted into the heater, and the said heated purified air is admitted into the blower through the pipe connection 23. To the opposite end of the housing and preferably at the top is located an exhaust pipe 24, through which the heated air after having been distributed in the housing is conveyed to the atmosphere by means of the pipe 25, if so desired or is continued on back to the pipe 21, or to a pipe 26 back to the blower. If it is desired to merely circulate the same heat medium distributed into the housing the circuit of the air is regulated by means of the dampers 27 located in the several pipes. On the opposite end of the filter 22 is attached a pipe 28 which connects to the pipe 23 and by means of the pipe cold air may be delivered into the machine if so desired and the dampers in the several pipes are so regulated as to complete the proper circuit without interference. The hot air distributing box 19 is located in the housing in proper relation with the operating mechanism (see Fig. 5), and the top of the box is suitably perforated so as to distribute the air equally throughout the entire housing.

In the bottom of the housing are located pipes 29, the same being suitably perforated so as to permit jets of steam to be delivered into the housing when it is desired to moisten the articles during their travel on the operating mechanism. These features for drying and moistening are very essential in the treatment of spaghetti as the spaghetti after having been cut in the proper lengths is suspended on rods for drying and after the same becomes dried to a certain degree the strands warp into all sorts of shapes. When this occurs it is necessary to moisten the same in order to bring the spaghetti back to its original straight shape; the same is again passed through the drying process and again moistened or steamed and this procedure is continued until the spaghetti is thoroughly dried and retained in its original straight position. During this procedure when the same is being dried the heated air is admitted and when it is desired to steam or moisten the spaghetti the heat is cut off and the steam jets placed in action.

I will now describe the operative mechanism which constitutes the essential feature of my invention, and it consists of a suitable frame work 30 around which the housing 16 is placed. On the horizontal members 31 and 32 of the frame work are supported sprocket wheels 33 and 34, these wheels being supported on short shafts and mounted in suitable journal bearings. The inner end of the short shaft on which the sprocket wheel 33 is mounted is provided with a disk 35 provided on its periphery with suitable recesses 36 in which is adapted to be carried the rods 37 on which the articles are suspended. Each side of the machine is identical in construction and the disks as just described are so arranged as to properly contact with each end of the rods 37 so as to carry the rods together with their contents and lodge the same evenly on the curved guide frames 38. Over the sprocket wheels 33 and 34 is placed an endless conveyer 39 consisting of a plurality of united links 40 having roller guides 41 which ride in the angle bars or guides 42, and each of the links is provided with a face block 43 on which the rods 37 are delivered and carried.

On the short shaft supporting the sprocket wheel 34 is located a large sprocket wheel 44, its teeth meshing with the sprocket chain 45 which passes over a sprocket pinion 46 having bearing in the take up boxes 47 by which the sprocket chain 45 is properly adjusted. The chain is also passed over a sprocket pinion 48 mounted upon the shaft 49 which extends across the entire machine from side frame to side frame (see Fig. 5), and on said shaft is also located a gear wheel 50 meshing with a gear pinion 51 by which the mechanism is driven through the medium of its shaft 52 and pulley 53. The chains 45 one of which is located on each side of the machine are passed upwardly and over sprocket wheels 54 by which the upper conveyers are placed in operation. The sprocket wheels 54 are supported on short shafts 55 mounted in take up boxes 56 supported on the upper horizontal members 57 of the frame work, and on the inner ends of the shafts 55 are located sprocket wheels 58 over which the upper conveyer 59 operates, this conveyer being similar in construction to the lower conveyer previously described. On the opposite end of the frame work are located short shafts 60 supported in bearings located on the upper horizontal members 61 of the frame and on these shafts are sprocket wheels 62 similar to the sprocket wheels 58 and over which the endless conveyer is guided. The outer ends of the shafts 55 and 60 are provided with gear wheels 63 which mesh with intermediate gears 64, they in turn meshing with gears 65 mounted on short shafts 66 supported in bearings located on the members 67 of the frame. On the inner end of these shafts are supported arm plates 68 and in the projecting ends 69 of the plates are adjustably supported the delivery arms 70. The free outer ends of the arms are suitably recessed as indicated by the numeral 71, and are of such size as to permit the insertion of the rods 37 so that said rods may be conveyed from the lower conveyer to the upper conveyer and likewise on the opposite end of the machine from the upper conveyer to the lower conveyer, and in order to permit the arms to properly contact with the rods the forward end 72 is somewhat shortened so as to pass over the rods and allow the rear end 73 to contact therewith. While the rods together with the contents are being carried from one conveyer to the other the same is held in position on the ends of the arms 70 by means of the curved guide frames 38 and 74.

The rods on which the spaghetti or other articles are supported are of such lengths as to extend across the machine permitting its ends to rest upon the companion conveyers. The machine is so geared as to cause the lower conveyer to operate at a speed much slower than the upper conveyer and in practice, as the articles are being transferred from one conveyer to the other the same when carried to the upper conveyer are spaced approximately twelve inches apart, while when the same are again carried from the upper conveyer to the lower conveyer the rods are spaced approximately four inches apart.

While the machine is in the position as shown in Fig. 4 the exits or inlets formed in the guide frame 38 being closed, the articles are continuously traveling around the machine from the upper to the lower and from the lower to the upper conveyer without molestation. When it is desired to remove the rods and their contents the latches 75 are released, or in other words permitted to hang down forming a free passage indicated by the numeral 76 through which the rods 37 may pass when conveyed upwardly by the arms 70 and when the passage is reached, the rods will of their own gravity pass down the incline 77 and lodge upon the support 78 from which the operator removes the same. When feeding the machine the latches 75 are released and the operator places the rods into the machine through the passages 76 and lodges the same on the spring actuated dog 79, the said rods remaining upon said dogs until carried away by the arms 70. The operation of the arms are in the direction as indicated by the arrows in Fig. 4, the dog 79 being spring actuated will be compressed when contacted with by the rods during their upward travel and permit the same to pass without hindrance. As the rods are being conveyed from the lower conveyer and distributed upon the upper conveyers the same may at times become out of alinement, one end being slightly in advance of the other, and in order to provide proper alinement on the opposite end so that the arm 70 may simultaneously contact, I provide stops or guides 80 connected to the inner guide or angle bar 81 and so adjusted as to permit the ends of the rods to contact with the inclined surface 82 and thus hold the rods in stationary position until carried away by the arms 70. A similar regulating device is provided for lining up the rods on the lower conveyers and this mechanism is located slightly in advance of the disks 35, the same consisting of springs 83 contacting with the rods, properly lining up the same before they are passed into the recesses of the disks. The blocks 43 of the links 40 comprising the lower conveyer are provided with projections 84 of sufficient height to carry the rods past the springs 83 and lodge the rods in the recesses of the disks 35.

With a machine of this character an enormous amount of space is saved where heretofore in treating and manufacturing spaghetti the drying process was the mere suspending of the rods on racks in rooms and permitting them to hang for a period of from four to six days and whenever the spaghetti became warped by drying it was necessary to convey the same on trucks into moistening rooms. This procedure required an over abundance of space. By my improved machine the spaghetti is being conveyed on traveling conveyers through a very small space in proportion to the space now used in such factories and is completely dried to its finished state without handling the same after once placed in the machine. The heat and moisture device is regulated according to the conditions existing during the operation.

I do not desire to limit myself to the use of my machine for treatment of spaghetti as any article requiring such treatment can be handled by the machine.

Having thus fully described my invention, what I claim as new and desire to have secured to me by the grant of Letters Patent, is:

1. A combination drying and moistening machine comprising an upper conveyer and a lower conveyer on which the articles to be treated are supported, one of said conveyers operating at a speed greater than the other and means for driving the same; means for delivering the articles from one conveyer to the other, a housing in which the conveyers are mounted and a heating device and a moistening device for drying and moistening the articles during their travel on the conveyers, substantially as specified.

2. A device of the class described comprising a suitable frame, an upper and a lower conveyer supported in the frame, a revolving mechanism whereby the articles supported on the conveyers are delivered from one conveyer to the other causing the articles to travel in a continuous circuit, means for operating the conveyers, a housing incasing the entire mechanism and drying and moistening means, substantially as specified.

3. A device of the class described comprising a frame, an upper and a lower conveyer supported in the frame, curved guide frames located at the ends of the frame and in relative position with the ends of the conveyers, delivery arms revolubly mounted in the frame and by which the articles are conveyed from one conveyer to the other, a heater box located in the frame by which heat is directed against the articles traveling on the conveyer, a moistening device by which moisture is admitted to the interior to contact with the articles and a housing incasing the entire mechanism, substantially as specified.

4. A device of the class described comprising a frame, a plurality of conveyers movably mounted in said frame, a plurality of revolving delivery arms positioned in proper relation with the conveyers and by which the articles carried by the conveyers are delivered from the lower conveyer to the upper conveyer and from the upper conveyer to the lower conveyer, suitable guide frames for guiding the articles during their travel from one conveyer to the other, means for properly spacing and lining up the articles before being brought in contact with the delivery arms, and a housing covering the entire operating mechanism, substantially as specified.

5. A device of the class described comprising a frame, a plurality of endless conveyers movably mounted in said frame and on which rods supporting the articles are carried, means for transferring the rods together with the articles from one conveyer to the other, suitable guide frames located at the ends of the conveyer for guiding the rods during their travel from one conveyer to the other, means formed on one set of guide frames for permitting the feeding or discharging of the articles, stops provided for the spacing and lining up of the rods before being delivered to the delivery arms, and a housing incasing the entire mechanism, substantially as specified.

6. A machine of the class described comprising conveyers one located above the other, the upper conveyer operating at a speed faster than the lower conveyer, rods carrying the articles to be treated, carried by said conveyers, and means for driving the same, a plurality of rotating delivery arms located in relative position with the conveyers and by which the rods carrying the articles are transferred from one conveyer to the other causing the articles to travel on an endless circuit, and a drying and moistening means operated alternately for moistening and drying the articles during their travel, substantially as specified.

7. A machine of the class described comprising a plurality of endless traveling conveyers, guide frames located at the ends of the conveyers and in proper relation therewith, means located in proper relation with the conveyers for transferring the articles from one conveyer to the other causing the articles to travel in an endless circuit, latches located on the guide frames at the feeding and discharge end of the machine by which the feeding and discharging of the articles is controlled, stops located in proper relation with the conveyers for spacing and lining up the articles prior to being fed in proper alinement with the delivery arms, and a housing in which the entire mechanism is located, substantially as specified.

8. A machine of the class described comprising a suitable frame, a plurality of endless traveling conveyers supported in the frame, the upper set of conveyers arranged to travel at a greater speed than the lower set and means for driving the same, a driving mechanism for operating the conveyers simultaneously, a means located on each end of the frame and in relative position with the conveyers for transferring the articles from one set of conveyers to the other, guide frames located in relative position with the delivery arms, means for supporting the articles during their travel from one conveyer to the other, a housing incasing the mechanism, a heating device and a moistening device located in the frame for moistening and drying the articles during their travel, substantially as specified.

In testimony whereof, I have signed my name to this specification, in presence of two subscribing witnesses.

THOMAS M. COYLE.

Witnesses:
ALFRED A. EICKS,
WALTER C. STEIN.